(12) United States Patent
Feng et al.

(10) Patent No.: US 9,396,144 B2
(45) Date of Patent: Jul. 19, 2016

(54) HIGH SPEED DATA TRANSMISSION

(71) Applicant: Texas Instruments Incorporated, Dallas, TX (US)

(72) Inventors: Jie Feng, Beijing (CN); Haiyang Yan, Beijing (CN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 801 days.

(21) Appl. No.: 13/689,913

(22) Filed: Nov. 30, 2012

(65) Prior Publication Data

US 2014/0052890 A1    Feb. 20, 2014

(30) Foreign Application Priority Data

Aug. 20, 2012    (CN) .......................... 2012 1 0381846

(51) Int. Cl.
*G06F 13/00* (2006.01)
*G06F 13/36* (2006.01)

(52) U.S. Cl.
CPC ..................... *G06F 13/36* (2013.01)

(58) Field of Classification Search
CPC ............ G06F 13/4022; G06F 13/4027; G06F 11/3055

USPC .......... 710/316–317, 305–306, 100; 714/749
See application file for complete search history.

(56) References Cited

U.S. PATENT DOCUMENTS

2011/0231726 A1* 9/2011 Yazaki .................... H04L 47/30
714/749

* cited by examiner

*Primary Examiner* — Tim T Vo
*Assistant Examiner* — Kim T. Huynh
(74) *Attorney, Agent, or Firm* — Gregory J. Albin; Frank D. Cimino

(57) ABSTRACT

A data reception circuit removes reliance on stacked transistors providing analog logic processing. A first trigger element outputs an up signal in response to receiving an indication of receipt of a data signal by a receiving device without consideration of an output signal from the receiving device. A second trigger element outputs a down signal in response to receiving an indication of receipt of a data signal by a receiving device without consideration of an output signal from the receiving device. Switches control provision of signals to a received signal line for the receiving device in response to the outputs of the trigger elements. A blocking feedback circuit provides a blocking signal for the receiving device to effect blocking the receiving device from sending data to the sending device when the receiving device is receiving data from the sending device.

13 Claims, 11 Drawing Sheets

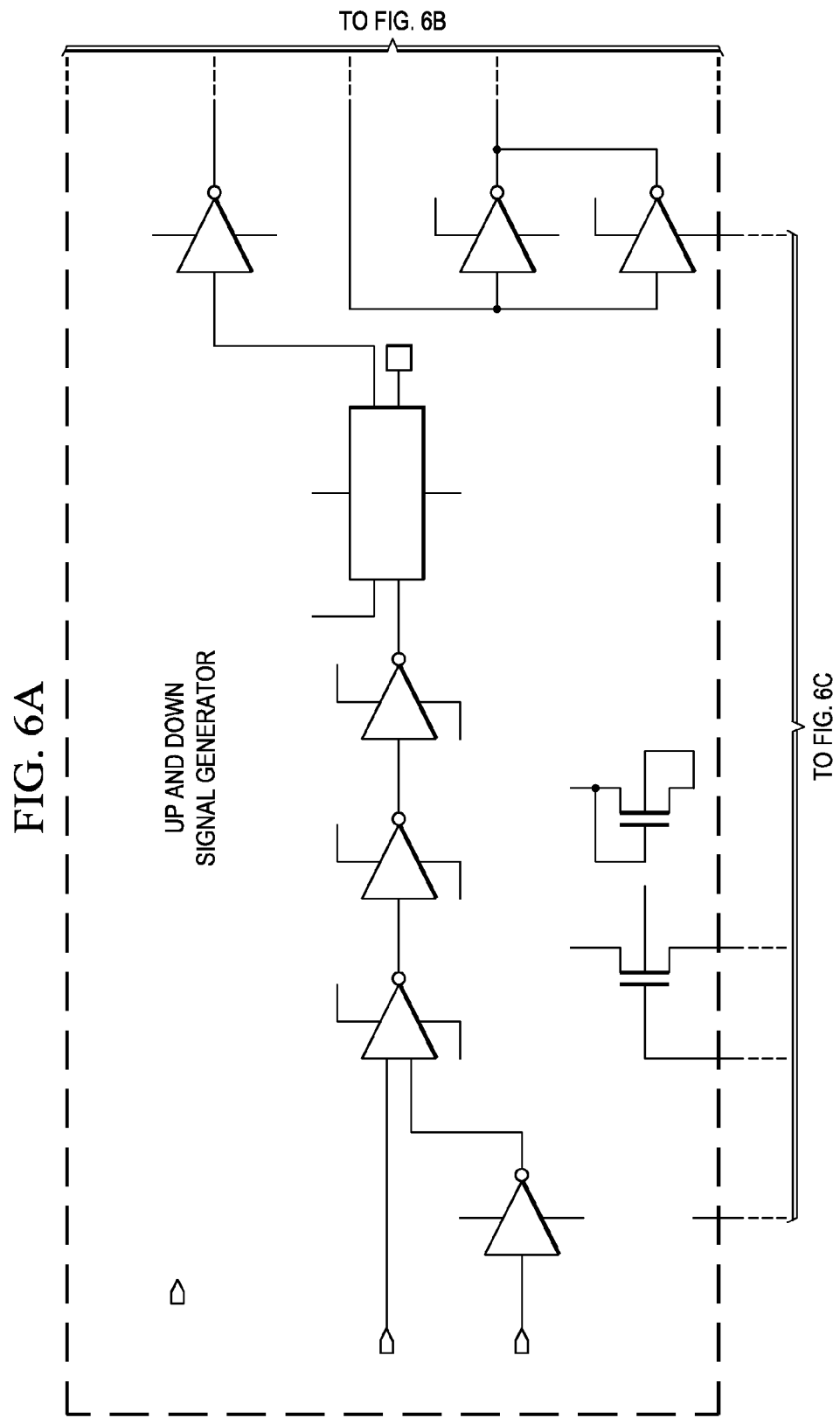

HIGH SPEED DATA TRANSMISSION

RELATED APPLICATIONS

This application claims the benefit of Chinese Application No. 201210381846.5, filed Aug. 20, 2012, which is incorporated by reference in its entirety herein.

TECHNICAL FIELD

This invention relates generally to data transmission between devices.

BACKGROUND

Electronic devices of various kinds are well known. Increasingly, electronic devices like mobile phones or tablet computers are being designed to communicate with other electronic devices to exchange information. One such approach includes tethering two devices together with a connector such as a universal serial bus (USB) wire. At the same time, more and more systems are multi-power-supply systems. The devices in the systems have to communicate with each other. For example a CPU with one power supply communicates with a peripheral device with the other power supply in the same system.

When two mobile or battery-based electronic devices are wired together for communication, a buffer is needed to account for each device's potentially operating at a different voltage level based on the individual device's battery's charge. To allow for data transmission between two such devices, circuitry is used to translate the sending device's data signal into a data signal that is safe to receive by the receiving device. Such translation devices typically also sense data transmission to stop conflicting traffic from the receiving device to the sending device during reception of data at the receiving device.

One known approach to handling this application is illustrated in FIG. 1, which illustrates a circuit 100 connected at a communication device B that is connected to a separate communication device A. The circuit 100 receives signals at an input line 105 that is connected to the communication device A. A level shifter 107 outputs a signal A1 to analog logic devices 110 and 112. The analog logic devices 110 and 112 also receive feedback regarding outbound data communications from the communication device B via a line 115. The analog logic devices 110 and 112 operate in response to the signals received on the line 105 from communication device A and the line 115 from communication device B to provide output signals to trigger elements 120 and 125. The trigger elements 120 and 125 also receive signals from another set of analog logic devices 130 and 132. The second set of analog logic devices 130 and 132 receives signals from a feedback line from communication device A 135 and a feedback line from communication device B 137. The second set of analog logic devices 130 and 132 processes the signals from the feedback lines and provide outputs to the trigger elements 120 and 125. The trigger elements 120 and 125 provide up and down signals to switches 140 and 142. The switches 140 and 142, in turn, charge the capacitor 150 or discharge the capacitor 150, which charges a line 160 connected to the receiving device B. The receiving device B reads the signals on line 160 to determine the data being received from sending device A.

In the application where two communication devices are connected by a wire for communication, it is advantageous to have simple circuitry that can operate and handle communications in high power supply and low data rate requirement situation, which refers to a loss of signal due to the operation of the elements of the circuit. Although the circuit in FIG. 1 largely accomplishes the goal to communicate between the two devices with different power supplies, the circuit 100 does so through the use of a stacked set of transistors to effect the operation of the analog logic circuit elements 110, 112, 130, and 132. The stack of transistor elements in circuit 100 causes a large delay in a low power supply situation in translating the data from communication device A to communication device B because of the need of the different data between the input side and the output side, which is especially difficult in low temperature situations or where the data is being sent with signals not having an especially sharp corner. The delay causes the low data rate. The circuit overall must respect this delay because data changes during processing of the signals can result in data error and possibly damage the circuitry because of potentially large currents being produced in the circuitry during data change in the midst of previous signal processing if the data rate is high.

SUMMARY

Generally speaking and pursuant to these various embodiments, a data reception circuit is provided that largely removes reliance on stacked transistors providing analog logic processing. In one example, a first trigger element outputs an up signal in response to receiving an indication of receipt of a data signal by a receiving device from a transmitting device without consideration of an output signal from the receiving device. A second trigger element outputs a down signal in response to receiving an indication of a cancelled trigger signal based on feedback regarding completion of receipt of the data signal from the receiving device without consideration of an output signal from the receiving device. Switches control provision of signals to a received signal line for the receiving device in response to the outputs of the first trigger element and the second trigger element. Moreover, in one approach, a blocking feedback circuit provides a blocking signal for the receiving device to effect blocking the receiving device from sending data to the sending device when the receiving device is receiving data from the sending device.

So configured, the logic circuits of the prior approach illustrated in FIG. 1 are removed from the data path. By removing these logic circuits, the data can be translated to the receiving device at an increased speed as a result of removing the delay introduced by those elements. It could operate in the low power situations and at a low cost having low leakage. Moreover, the blocking feedback circuit can block the receiving device from sending signals during receipt of data from the sending device removing concern about overlap between input data and output data to avoid the data error and the damage to the device. These and other benefits may become clear upon making a thorough review and study of the following detailed description.

BRIEF DESCRIPTION OF THE DRAWINGS

The above needs are at least partially met through provision of the high speed data transmission described in the following detailed description and particularly when studied in conjunction with the drawings wherein:

FIGS. 6A-6F comprise a circuit diagram showing an example circuit manufactured in accordance with various embodiments of the invention.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION

Figure 2:
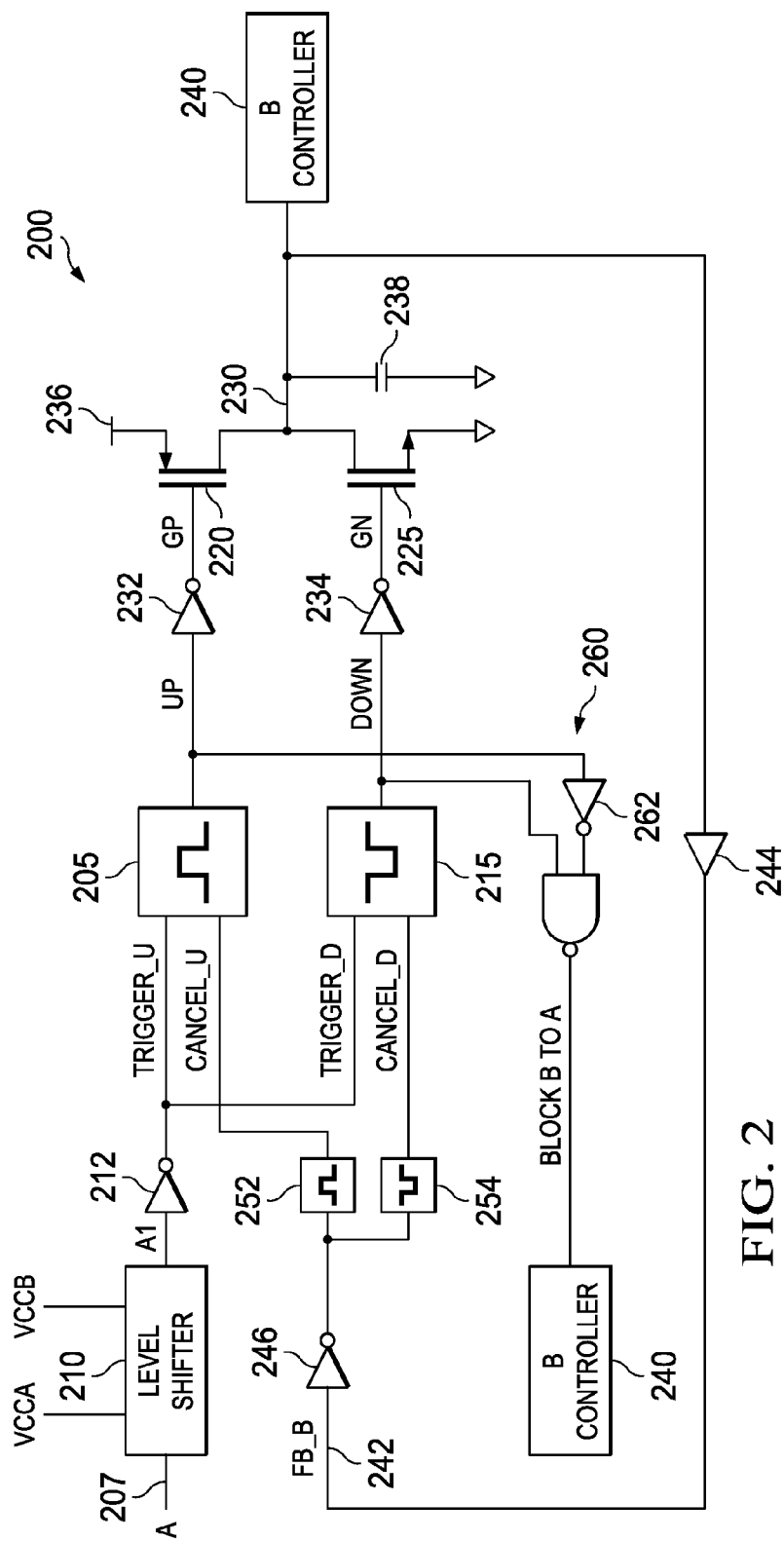
FIG. 2 comprises a circuit diagram of an example data translator device as configured in accordance with various embodiments of the invention.

Referring now to the drawings, and in particular to FIG. 2, an illustrative apparatus 200 that is compatible with many of these teachings will now be presented. In the example of FIG. 2, the apparatus 200 is disposed with a receiving device B to receive data from a transmitting device A. A first trigger element 205 is configured to output an up signal in response to receiving an indication of receipt of a data signal such as a high data signal by a receiving device B from a transmitting device A without consideration of an output signal from the receiving device B. The first trigger element 205 is further configured to stop outputting the up signal in response to receiving an indication of a cancel up trigger signal based on feedback from the receiving device B regarding completion of receipt of the data signal without consideration of an output signal from the receiving device B. In this example, the data signal from transmission device A is received over an input line 207 at a level shifter 210 to make sure the voltage of the data signal from transmission device A matches the operating voltage of the receiving device B. The level shifter 210 outputs a shifted data signal Al that traverses a "NOT" circuit element 212 before provision to the first trigger element 205.

A second trigger element 215 is configured to output a down signal in response to receiving an indication of receipt of a low data signal by the receiving device B from the transmitting device A without consideration of an output signal from the receiving device B. Additionally, the second trigger element 215 is further configured to stop outputting the down signal in response to receiving an indication of a cancel down trigger signal based on feedback from the receiving device B regarding completion of receipt of the low data signal without consideration of an output signal from the receiving device B.

Switches 220 and 225 are configured to receive the up signal and the down signal and to control provision of signals on a received signal line 230 for the receiving device B in response to the up signal and the down signal. In the example of FIG. 2, the switches include a first switch 220 (shown as a PMOS transistor) configured to be triggered to pull the received signal line 230 for the receiving device B high in response to the first trigger element's 205 outputting the up signal.

The switches also include a second switch 225 (shown as an NMOS transistor) configured to be triggered to pull the received signal line 230 for the receiving device B low in response to the second trigger element's 215 outputting the down signal. In the illustrated example, the up signal and down signal are processed through respective "NOT" circuits 232 and 234 before provision to the switches 220 and 225. The switches 220 and 225 effect the control of the received signal line 230 by connecting the line 230 to a system voltage to charge a capacitor 238 as part of pulling the line 230 high. The received signal line 230 is operatively connected to a receiving device controller 240 for the receiving device B such that the controller 240 can determine the data being received from the transmission device A.

A receiving device feedback line 242 provides feedback to the apparatus 200 with respect to the data signals being received by the receiving device B. In this example, the receiving device feedback line 242 is output from an amplifier 244 connected to the received signal line 230, although other configurations are possible. Signals on the receiving device feedback line 242 are processed through a "NOT" circuit 246 and through a rising edge detector element 252 that provides a cancel signal to the first trigger element 205 and through a falling edge detector element 254 that provides a cancel signal to the second trigger element 215. In turn, the first trigger device 205 is configured to cancel the up signal in response to receiving a cancel signal based on feedback from the receiving device B, such as through the example configuration described above. The second trigger device 215 is further configured to cancel the down signal in response to receiving a cancel down signal based on feedback regarding being ready to receive a new data signal from a receiving device A. So configured, this apparatus 200 is contrasted with that of FIG. 1, which was symmetrically designed and thus needed to have an input to analog logic circuits 110, 112, 130, and 132 to help account for the output signal from the receiving device B.

The apparatus 200 instead accounts for output data from the receiving device B by including a blocking feedback circuit 260 configured to provide a blocking signal for the receiving device B to effect blocking the receiving device B from sending data to the sending device A when the receiving device B is receiving data from the sending device A. In the example of FIG. 2, the line that carries the up signal from the first trigger element 205 is connected to a "NOT" circuit 262, which circuit's output is provided to a "Nand" gate circuit element 264. A second input of the "Nand" gate circuit element 264 is connected to the line that carries the down signal from the second trigger element 215. The output of the "Nand" gate circuit element 264 is provided to a receiving device controller 240. The receiving device controller 240 is configured to receive signals from the received signal line 230 and from the blocking feedback circuit 260, wherein the receiving device controller 240 is configured to control the receiving device B to not send data to the sending device A in response to receiving the blocking signal from the blocking feedback circuit 260. The receiving device controller 240 is illustrated as two separate elements but may be the same circuit merely having pathways to electrically connect as illustrated in FIG. 2. Those skilled in the art will recognize and appreciate that such a controller can comprise a fixed-purpose hard-wired platform or can comprise a partially or wholly programmable platform. All of these architectural options are well known and understood in the art and require no further description here.

FIG. 2 illustrates one example configuration where the first trigger element is configured to receive the indication of receipt of the data signal without use of an analog logic circuit element having inputs other than the indication of receipt of the data signal from the transmitting device. Such an apparatus can achieve a higher data rate than previous structures. For example, if the power supply such as a battery for the receiving device is high (resulting in a higher than average operating voltage such as 1.2 Volts), the width of the charging signal, such as at the received signal line 230, is determined by the difference between the rising edge of the input signal and the rising edge of the output signal, and the width of the discharging signal is determined by the difference between the falling edge of the input signal and the falling edge of the output signal. In the old circuit of FIG. 1, this could result in data rates of 50 mega bits per second (Mbps) or higher. If the power supply is low, however, (resulting in an operating voltage about 0.9 volts or less) the width of the charging signal and the width of the discharging signal are determined by the RC constant in the one-shot data translator generator resulting in data rates that could be lower than 15 Mbps. This RC constant is determined in part by the analog logic circuit; therefore, the apparatus of FIG. 2 decreases the total delay of the data transfer because of the removal of the logic circuit such as NOR and NAND circuit elements in the data path and the feedback path.

Figure 3:
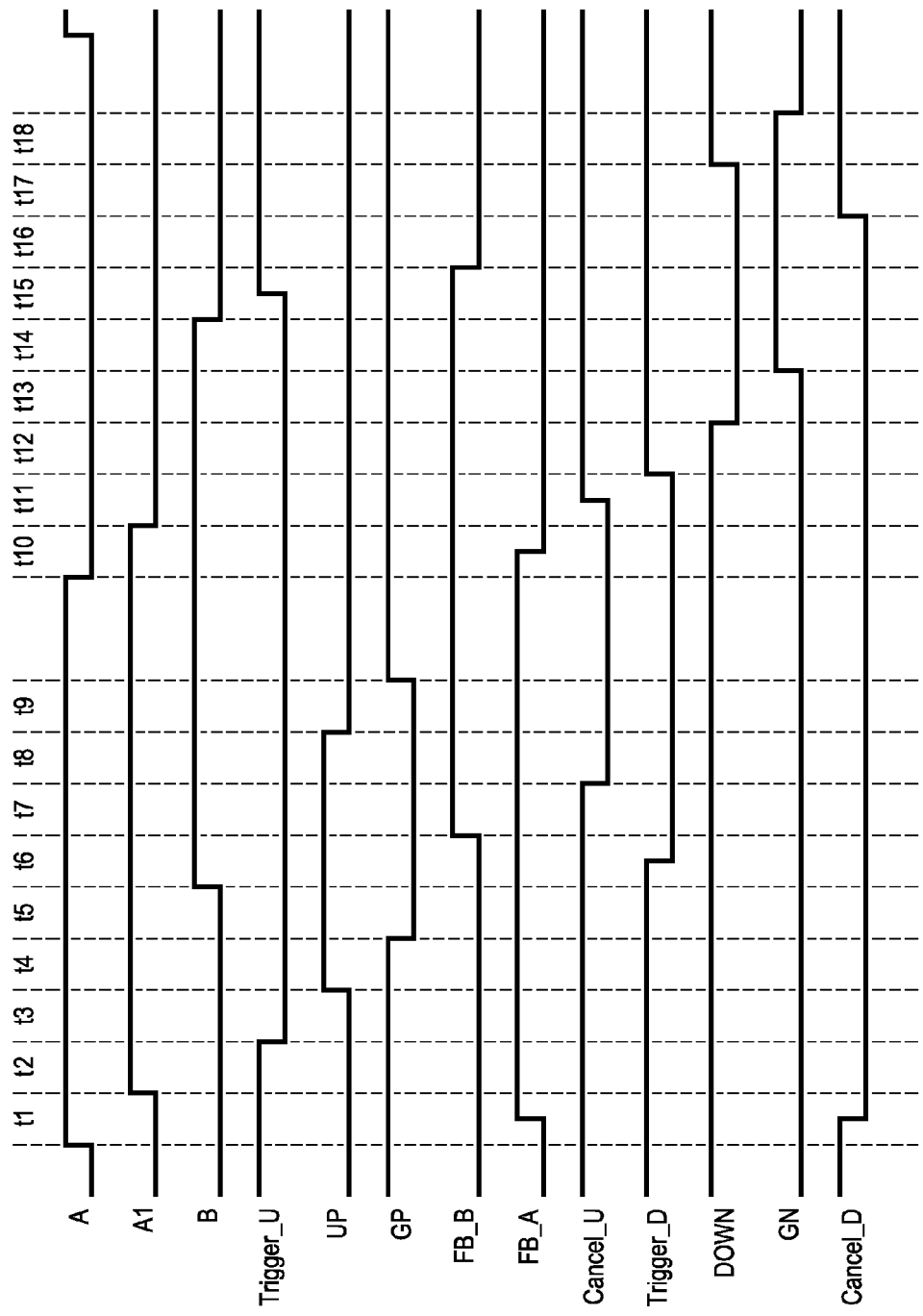
FIG. 3 comprises a signal diagram showing an example of signaling for the circuit of FIG. 1 in response to signaling from device A.
Figure 4:
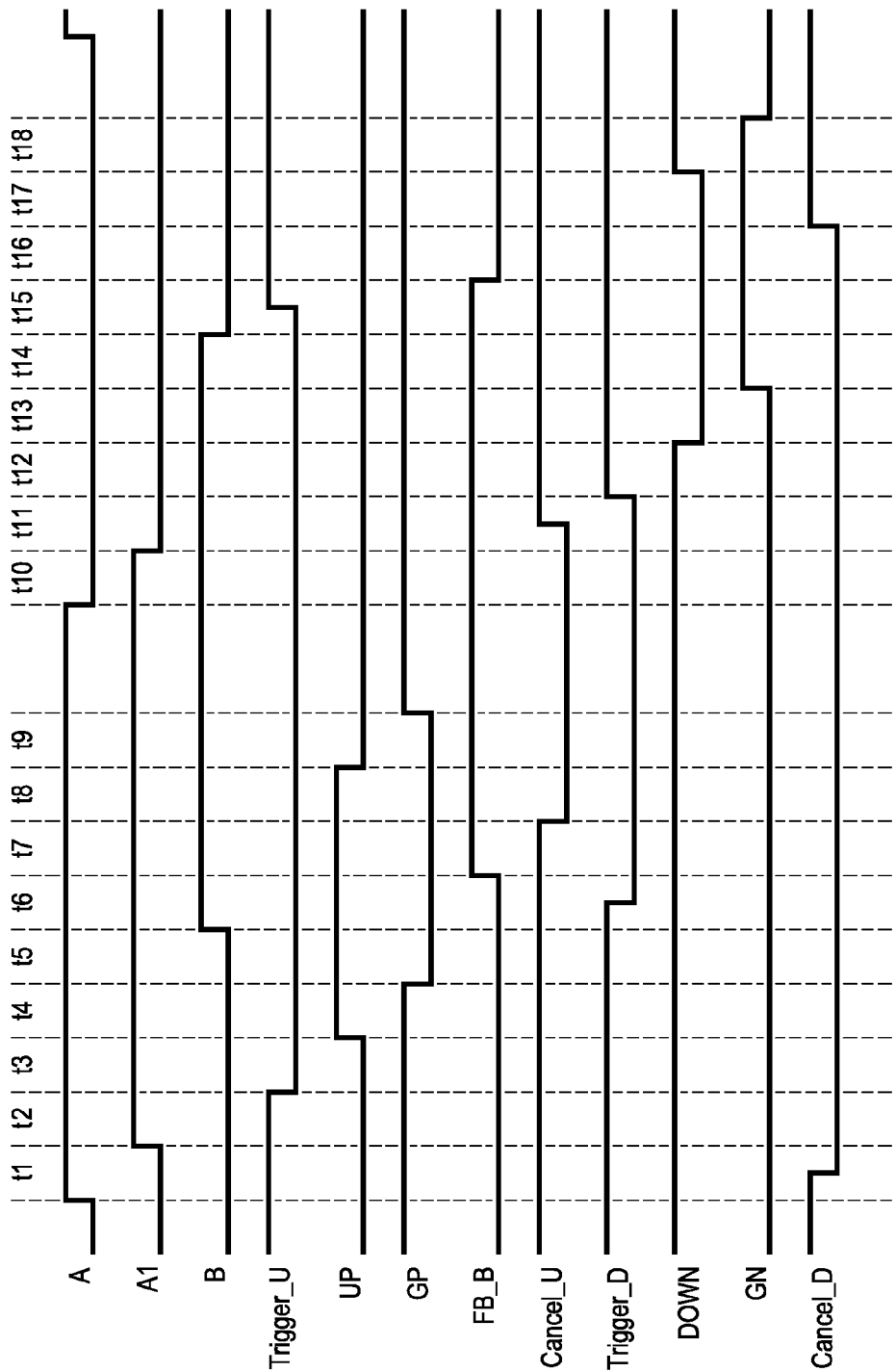
FIG. 4 comprises a signal diagram showing an example of signaling for the circuit of FIG. 2 in response to signaling from device A.

This improvement in data rate is illustrated in the signal timing diagrams of FIGS. 3 and 4. FIG. 3 illustrates example perfect square waveforms or signals at the indicated portions of the circuit of FIG. 1 for the situation of the receiving device B receiving data from the transmission device A. The vertical lines marked with t1 through t18 indicate arbitrary time markers to illustrate the relative timing of the signals propagating through the circuit. FIG. 4 illustrates example perfect square waveforms or signals at the indicated portions of the apparatus 200 of FIG. 2 for the receiving device B's receiving the same signals from the transmission device A as that of FIG. 3. Although the timing looks identical, because the apparatus of FIG. 2 operates without the analog logic elements of FIG. 1, the timing elements t1 through t18 of FIG. 4 take less time than the same timing elements t1 through t18 of FIG. 3. In other words, various ones of t1 through t18 of FIG. 4 is shorter in time than the corresponding time slots t1 through t18 of FIG. 3.

More specifically, when the receiving device operates with a low power supply, for example, 0.9 Volts, t2 is the dominant time for bit 1, and t11 is the dominant time for bit 0. For FIGS. 3 and 4, T_bit_1 occurs over time portions t1 through t5, and T_bit_0 occurs over time portions t10 through t14. Because there are stack transistors to provide the "NOR" and "NAND" analog logic circuits in the prior art approach of FIG. 1, the data transmission delay is large especially for weak corner signals (where the perfect square waveforms of the figures are replaced with more pronounced rounded signals) and low temperature operating environments, each of which increase the charging and discharging times for the various circuit elements. In that circuit, therefore, the data rate is DataRate<=1/max (T_bit_1, T_bit_0). In contrast, with the removal of the analog logic circuit elements, the data rate of the apparatus 200 of FIG. 2 is determined by the width of the charging signal (GP) on the first switch 140 or the width of the discharging signal (GN) on the second switch 142, DataRate<=1/max (width of GP, width of GN).

Figure 1:
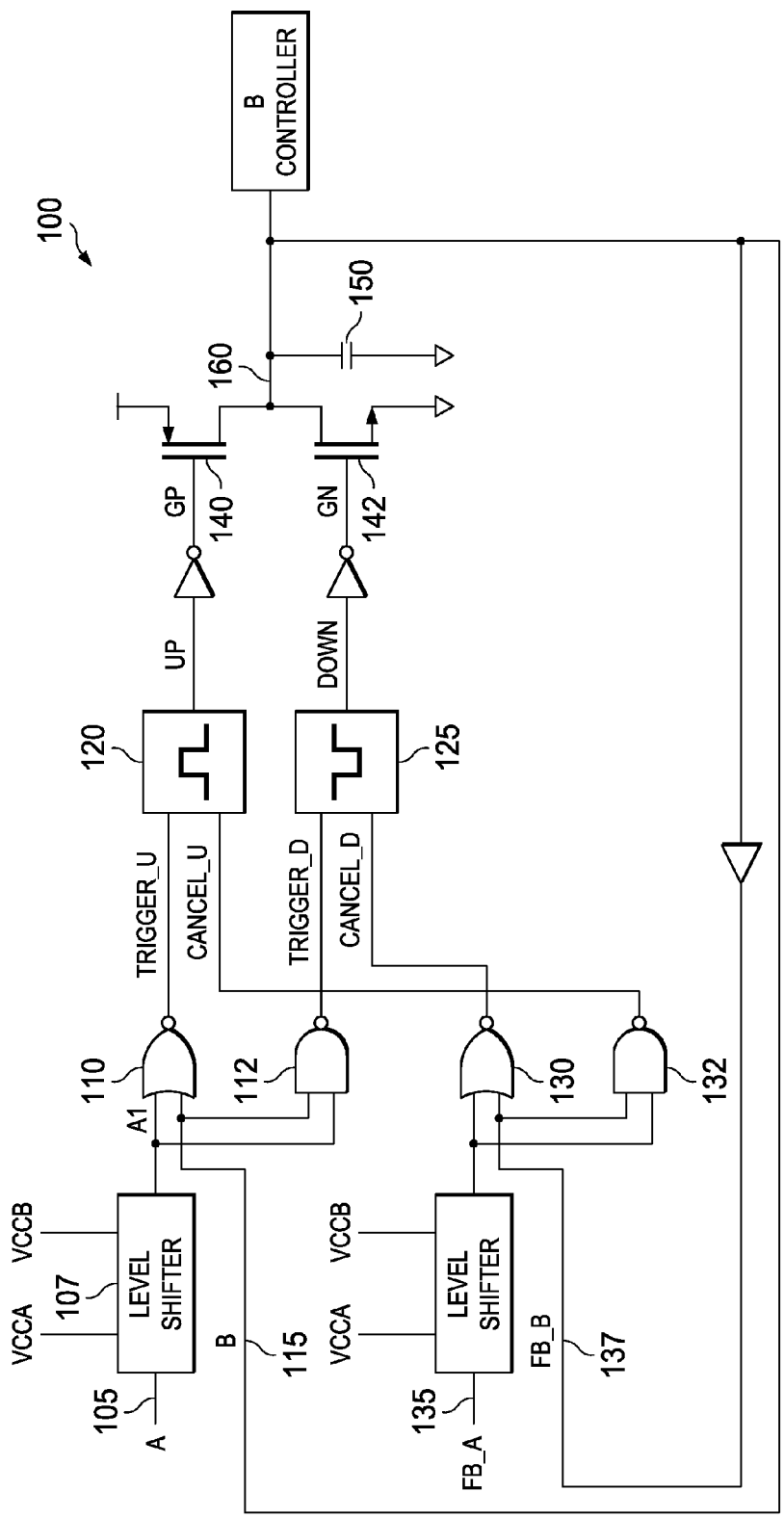
FIG. 1 comprises a circuit diagram for an example prior art data translator device.

Moreover, when using the circuit of FIG. 1, the data of the input cannot be changed during T_bit_1 and T_bit_0. For example, if the input changes from 1 to 0 when it is T_bit_1 and the data translation direction is from the transmitting device A to receiving device B, the receiving device cannot recognize that the data is from transmitting device A to receiving device B (where the input is "0" from the transmitting device A) or being sent from the receiving device B to the transmitting device A (input is "1" from the receiving device B). This lack of recognition results from the circuit's being completely symmetrical. In this circumstance, the circuit of FIG. 1 will trigger the one-shot signal on the input side and cause a data error and damage the chip because of the large current. The operation of the blocking feedback circuit 260 prevents this from happening with the apparatus 200 of FIG. 2.

A method 500 of operation of an apparatus like that of FIG. 2 will be described with reference to FIG. 5. A receiving device receives 505 a data signal from a transmitting device on an input line. The method also includes outputting 510 an up signal from a first trigger element in response to receiving an indication of receipt of the data signal by a receiving device without consideration of an output signal from the receiving device. The method further includes outputting 515 a down signal from a second trigger element in response to receiving an indication of receipt of a low data signal by the receiving device from the transmitting device without consideration of an output signal from the receiving device.

A signal is provided 525 to the receiving device regarding the data signal. The signal is provided according to a variety of conditions. In one aspect, a first switch pulls a received signal line for the receiving device high in response to the first trigger element's outputting the up signal. In another aspect, a second switch pulls the received signal line for the receiving device low in response to the second trigger element's outputting the down signal. The up and down signals may be cancelled as well. For instance, the up signal can be cancelled in response to receiving a cancel signal based on feedback from the receiving device, and the down signal can be cancelled in response to receiving a cancel down signal based on feedback regarding being ready to receive a new data signal from a receiving device.

So configured, while prior circuits used the difference between the input signal and the output signal to create the charge or discharge signal for providing the signal regarding received data to the receiving device and then used this difference to cancel the charge or discharge signal, the new approach uses the rising edge of the input signal to create charge signal and the rising edge of the output signal to cancel the charge signal. The new approach also uses the falling edge of the input signal to create discharge signal and the falling edge of the output signal to cancel the discharge signal.

Figure 5:
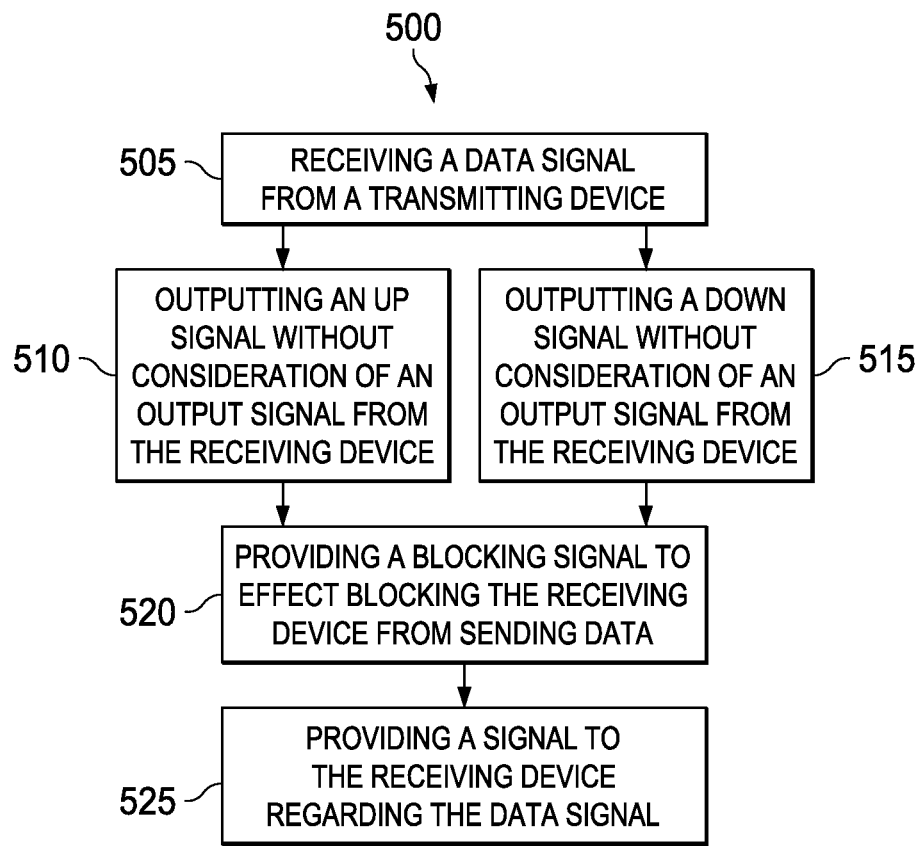
FIG. 5 comprises a flow diagram of a method of operation in accordance with various embodiments of the invention.
Figure 6B:
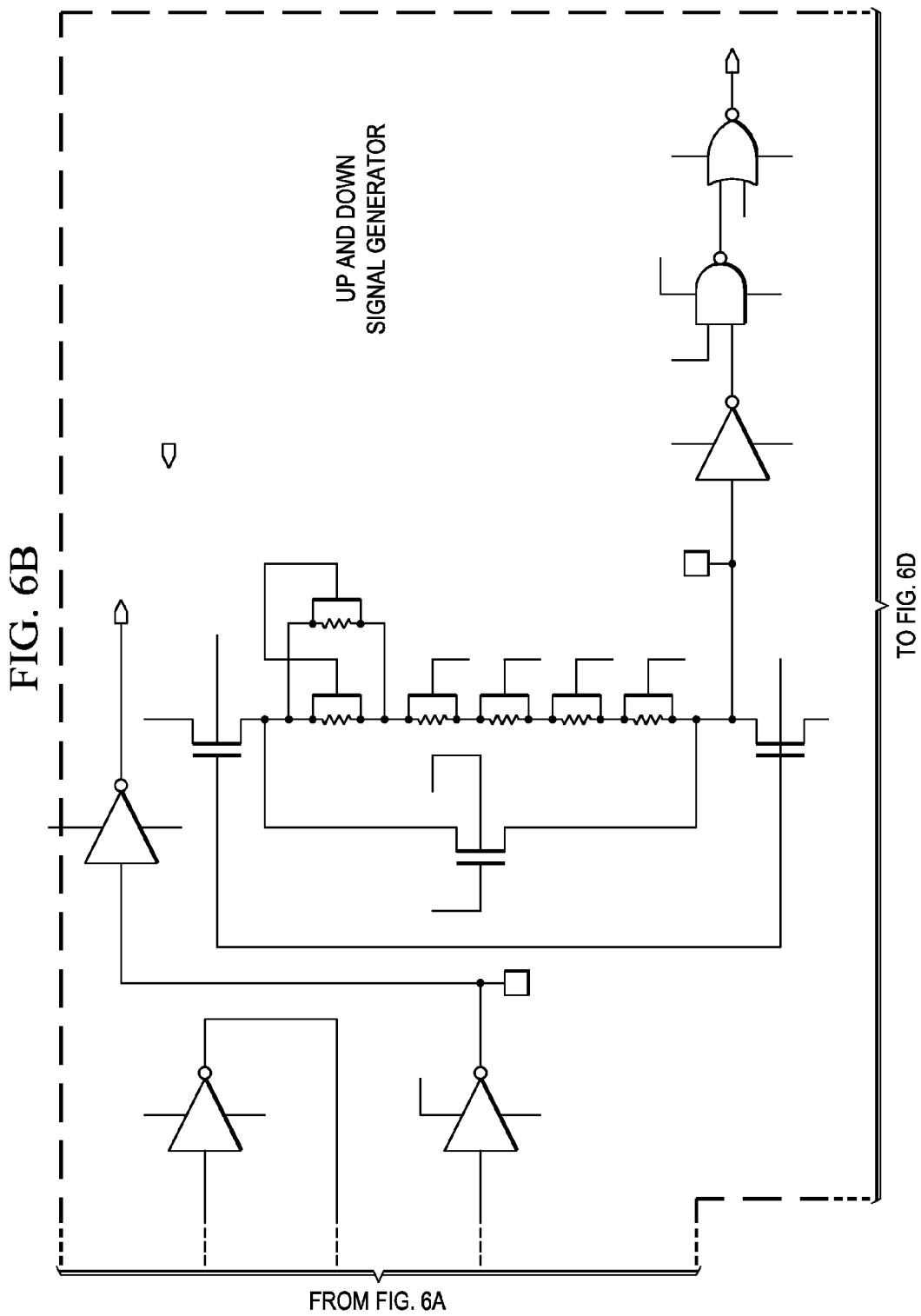
Figure 6C:
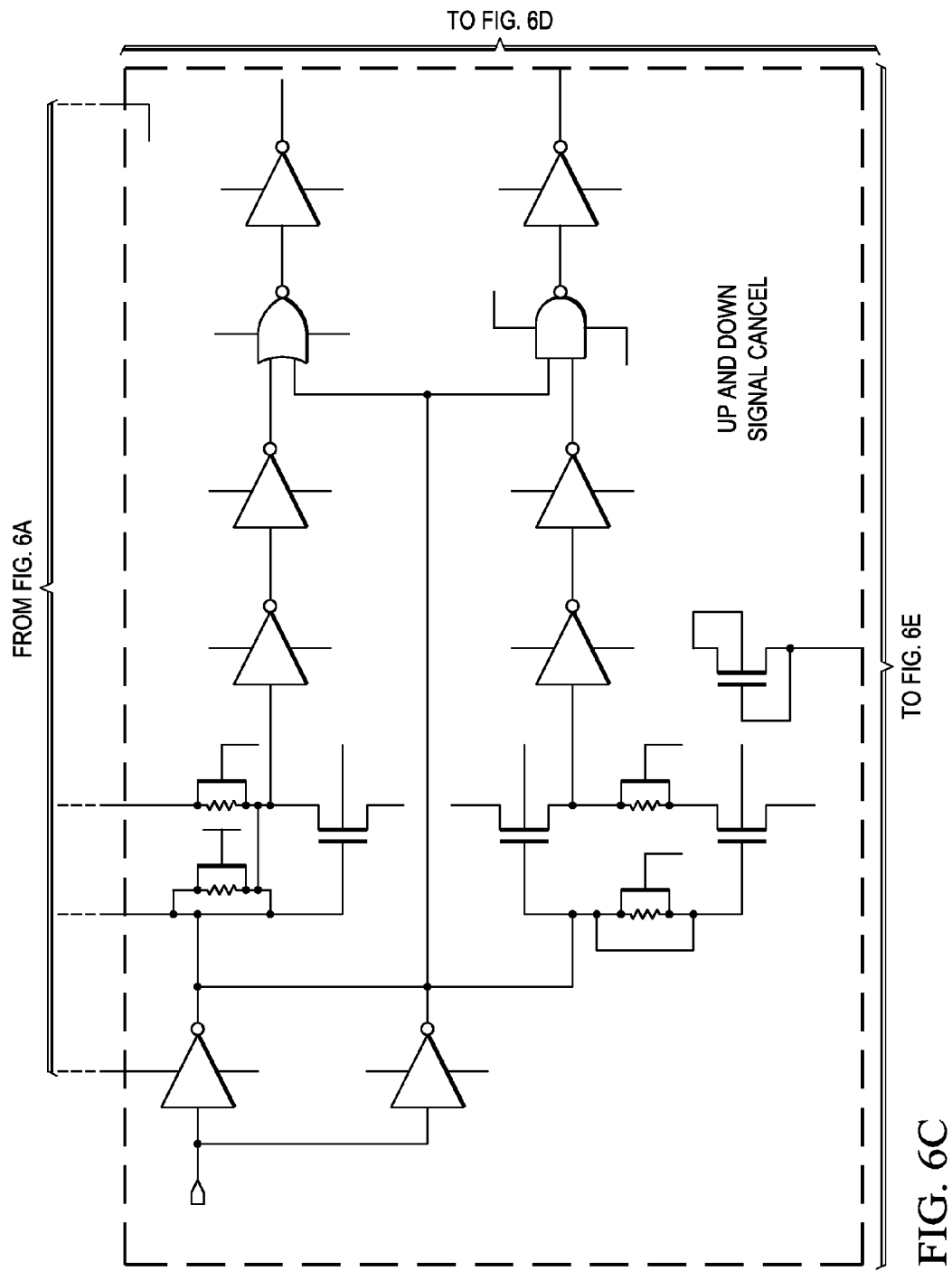
Figure 6D:
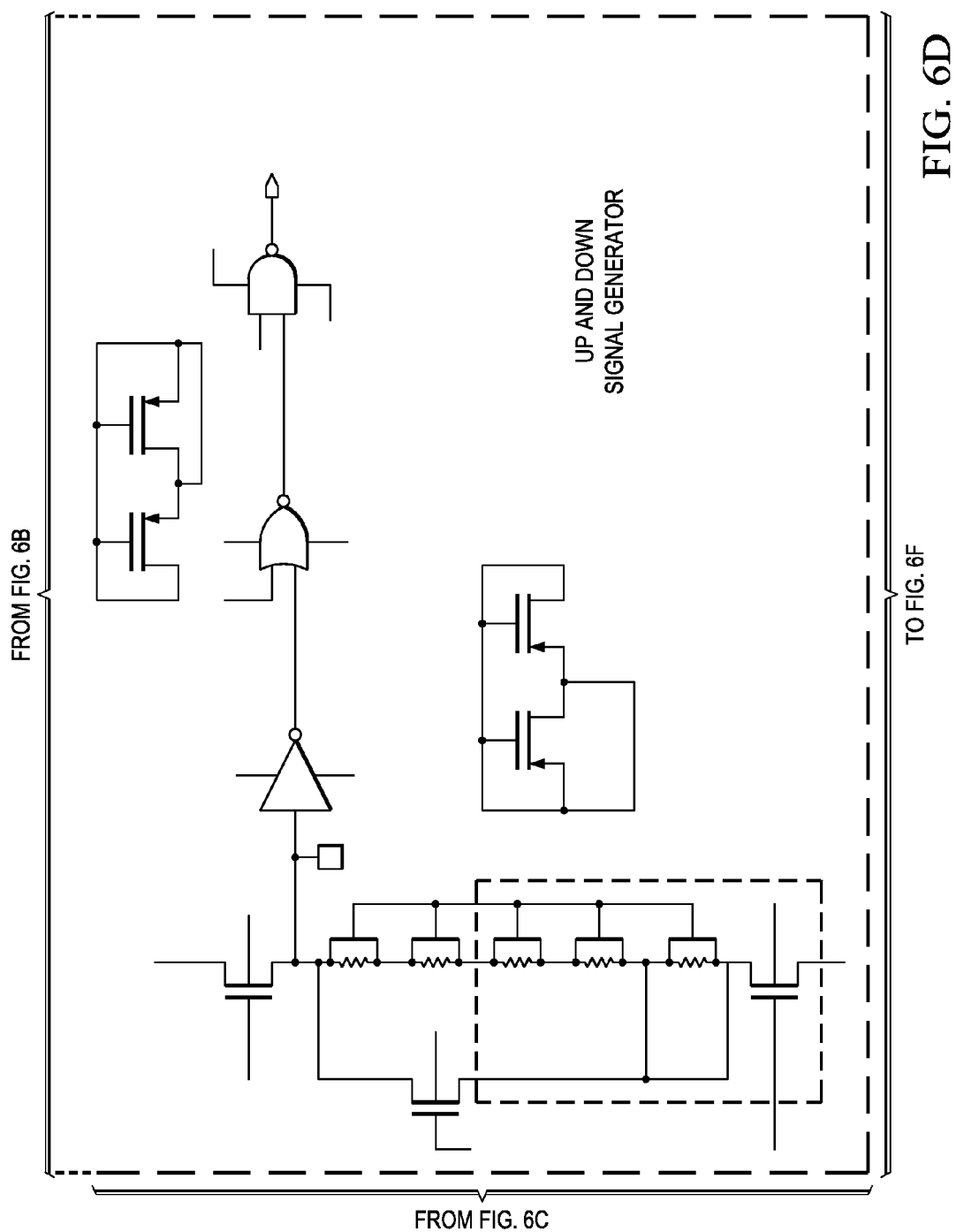
Figure 6E:
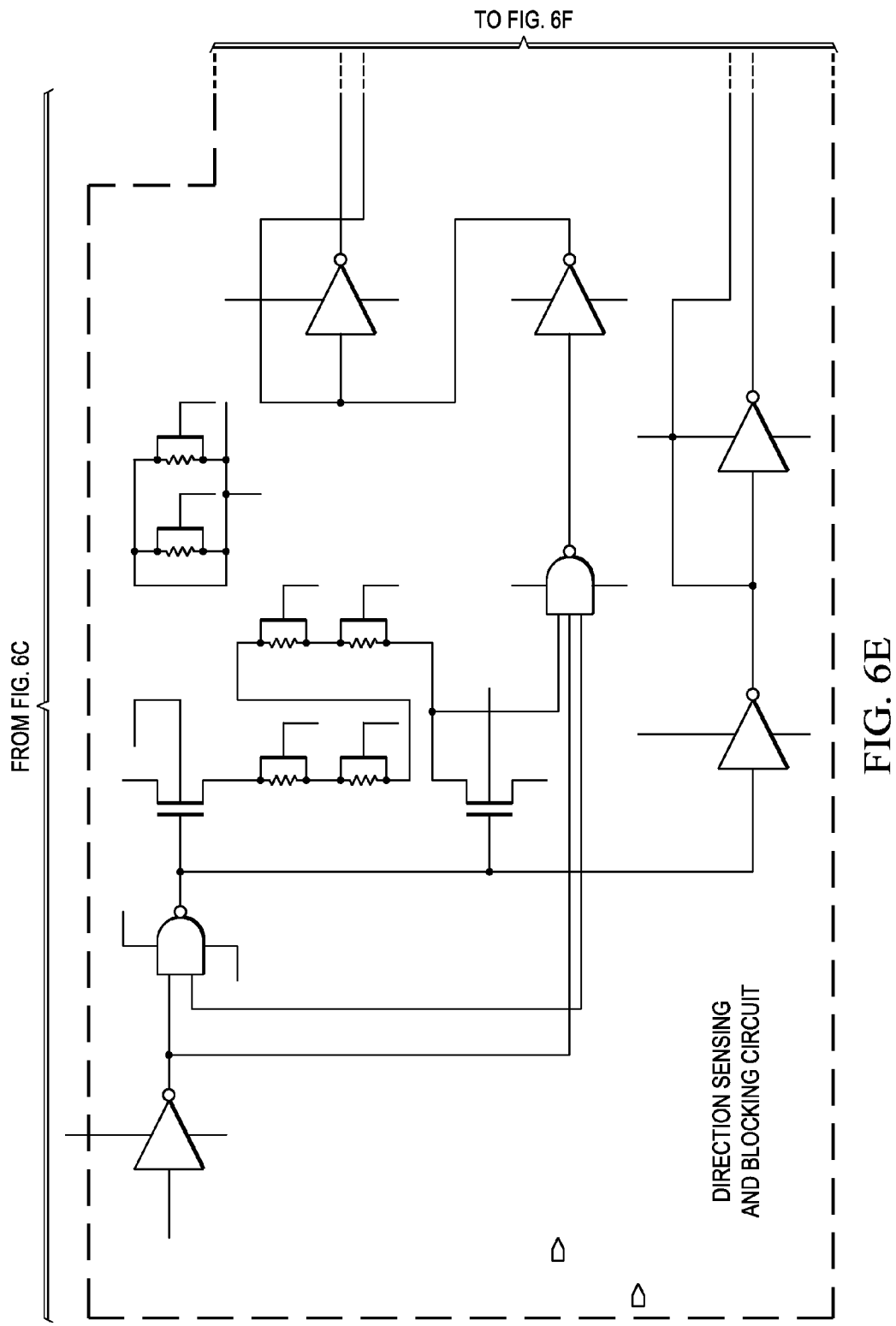
Figure 6F:
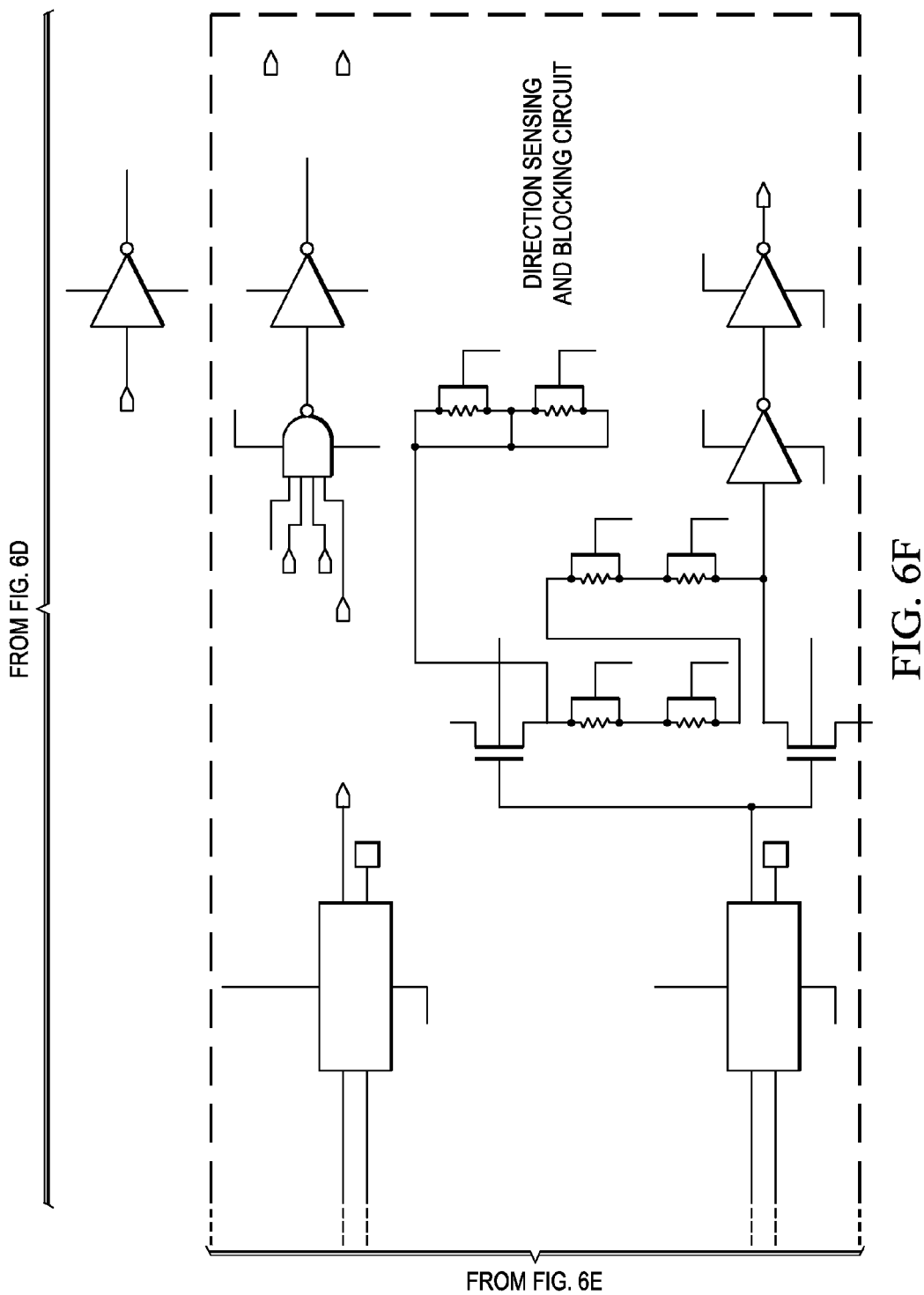

With continuing reference to FIG. 5, a blocking feedback circuit provides 520 a blocking signal for the receiving device to effect blocking the receiving device from sending data to the sending device when the receiving device is receiving data from the sending device. In one example, the blocking feedback circuit provides the blocking signal based on the signals provided from the first trigger element and the second trigger element, which do not rely on feedback regarding outbound data signals from the receiving device.

Although the flow chart of FIG. 5 shows a specific order of implementation, it is understood that the order may differ from that which is depicted, depending upon various factors such as, for example, the time it takes for various circuits to complete various tasks, and the like. For example, the order of two or more blocks may be scrambled relative to the order shown. Also, two or more blocks shown in succession may be executed concurrently or with partial concurrence. It is understood that all such variations are within the scope of the present invention.

An example detailed circuit diagram for a circuit that operates in accordance with the various teachings of this disclosure is illustrated in FIGS. 6A-6F. The portions 6A, 6B, and 6D labeled as the "up and down signal generator" correspond generally with the first trigger element 205, the second trigger element 215, and the "Not" circuits 232 and 234 of FIG. 2. The circuit portion of FIG. 6C labeled "up and down signal cancel" corresponds generally with the feedback portion of FIG. 2 including the "Not" circuit 246, the rising edge detector element 252, and the falling edge detector element 254. The circuit portions of FIGS. 6E and 6F labeled "directions sensing and blocking circuit" correspond generally to the blocking feedback circuit 260 of FIG. 2. Those of skill in the art will recognize that there are a variety of ways to design specific implementations of circuitry to realize the teachings of this disclosure.

The approach of this disclosure can be applied in a variety of contexts. For instance, mobile phones can be connected by wire to communicate with a variety of devices such as computers, video displays, tablet computers, and the like. In that situation, data can be sent from the mobile phone to those other devices, and the mobile phone can receive data from any of those devices. In such circumstance, a user will appreciate faster data exchanges, such as when multimedia files are exchanged. Application of various teachings of this disclosure can help in such circumstances because of the increased data rate realized by the new approach. Moreover, the circuitry of the new approach is generally simpler with the removal of the analog logic elements. Additionally, the new approach operates at a lower electrical cost because of the reduction in circuit elements. The new approach also reduces current leakage because of the reduction in use of low voltage transistors.

Those skilled in the art will recognize that a wide variety of modifications, alterations, and combinations can be made with respect to the above described embodiments without departing from the scope of the invention. For example, although there is reference to a "high" data signal and "low" data signal, these can be flipped, and circuits can be configured to reverse such signals. Thus, the "high" and "low" data signal indications merely refer to different data signals. Such modifications, alterations, and combinations are to be viewed as being within the ambit of the inventive concept.

What is claimed is:

1. An apparatus for translating data from one device to another, the apparatus comprising:
    a received signal line for a receiving device;
    a first trigger element configured to output an up signal in response to receiving an indication of receipt of a high data signal from a transmitting device without consideration of an output signal from the receiving device;
    a second trigger element configured to output a down signal in response to receiving an indication of receipt of a low data signal from the transmitting device without consideration of an output signal from the receiving device;
    a first switch coupled to the first trigger element and to the received signal line, the first switch being configured to receive the up signal and to pull the received signal line high in response to the receiving the up signal; and
    a second switch coupled to the second trigger element and to the received signal line, the second switch being configured to pull the received signal line low in response to receiving the down signal.

2. The apparatus of claim 1 wherein:
    the first trigger element is further configured to stop outputting the up signal in response to receiving an indication of a rising edge of a feedback signal from the receiving device; and
    the second trigger element is further configured to stop outputting the down signal in response to receiving an indication of a falling edge of the feedback signal from the receiving device.

3. The apparatus of claim 1 further comprising a blocking feedback circuit configured to provide a blocking signal for the receiving device to effect blocking the receiving device from sending data to the sending device when the receiving device is receiving data from the sending device.

4. The apparatus of claim 3 further comprising a receiving device controller configured to receive signals from the received signal line and from the blocking feedback circuit, wherein the receiving device controller is configured to control the receiving device to not send data to the sending device in response to receiving the blocking signal from the blocking feedback circuit.

5. The apparatus of claim 1 wherein the first trigger element is configured to receive the indication of receipt of the high data signal without use of an analog logic circuit element having inputs other than a data signal from the transmitting device.

6. The apparatus of claim 1 wherein the first trigger device is further configured to cancel the up signal in response to receiving a cancel signal based on feedback from the receiving device.

7. The apparatus of claim 1 wherein the second trigger device is further configured to cancel the down signal in response to receiving a cancel down signal based on feedback regarding being ready to receive a new data signal from a receiving device.

8. A method comprising:
    receiving a high data signal from a transmitting device on an input line;
    outputting an up signal from a first trigger element in response to receiving an indication of receipt of the high data signal without consideration of an output signal from a receiving device;
    pulling a received signal line for the receiving device high in response to the up signal;
    outputting a down signal from a second trigger element in response to receiving an indication of receipt of a low data signal from the transmitting device without consideration of an output signal from the receiving device; and
    pulling the received signal line for the receiving device low in response to the down signal.

9. The method of claim 8 further comprising cancelling the up signal in response to receiving an indication of a rising edge of a feedback signal from the receiving device.

10. The method of claim 8 further comprising cancelling the down signal in response to receiving an indication of a falling edge of the feedback signal from the receiving device.

11. The method of claim 8 further comprising providing a blocking signal for the receiving device to effect blocking the receiving device from sending data to the sending device when the receiving device is receiving data from the sending device.

12. An apparatus for translating data from one device to another, the apparatus comprising:
- a first trigger element configured to:
  - receive an indication of receipt of a high data signal from a transmitting device without use of an analog logic circuit element having inputs other than the a data signal from the transmitting device,
  - output an up signal in response to receiving the indication of receipt of the high data signal from the transmitting device without consideration of an output signal from a receiving device, and
  - cancel the up signal in response to receiving a cancel up signal based on feedback from the receiving device;
- a second trigger element configured to:
  - receive an indication of receipt of a low data signal from the transmitting device without use of an analog logic circuit element having inputs other than the data signal from the transmitting device;
  - output a down signal in response to receiving the indication of receipt of the low data signal from the transmission device without consideration of the output signal from the receiving device, and
  - cancel the down signal in response to receiving a cancel down signal based on the feedback from the receiving device;
- a first switch configured to pull a received signal line for the receiving device high in response to the up signal;
- a second switch configured to pull the received signal line low in response to the down signal;
- a blocking feedback circuit configured to provide a blocking signal for the receiving device to effect blocking the receiving device from sending data to the sending device when the receiving device is receiving data from the sending device; and
- a receiving device controller configured to receive signals from the received signal line and from the blocking feedback circuit, wherein the receiving device controller is configured to control the receiving device to not send data to the sending device in response to receiving the blocking signal from the blocking feedback circuit.

13. The apparatus of claim 1, further comprising:
- a level shifter having an input coupled to an input line, and an output; and
- an inverter having an input coupled to the output of the level shifter, and an output coupled to an input of the first trigger element and to an input of the second trigger element.

* * * * *